United States Patent
Rosensprung et al.

(10) Patent No.: US 10,572,427 B2
(45) Date of Patent: Feb. 25, 2020

(54) DEVICE PROGRAMMING SYSTEM WITH PROTOCOL EMULATION

(71) Applicant: Data I/O Corporation, Redmond, WA (US)

(72) Inventors: Anthony Rosensprung, Bothell, WA (US); Andrew Wygle, Redmond, WA (US); Benjamin Michael Deagen, Lynnwood, WA (US)

(73) Assignee: Data I/O Corporation, Redmond, WA (US)

( * ) Notice: Subject to any disclaimer, the term of this patent is extended or adjusted under 35 U.S.C. 154(b) by 0 days.

(21) Appl. No.: 16/190,125

(22) Filed: Nov. 13, 2018

(65) Prior Publication Data
US 2019/0146934 A1 May 16, 2019

Related U.S. Application Data

(60) Provisional application No. 62/585,518, filed on Nov. 13, 2017.

(51) Int. Cl.
| | | |
|---|---|---|
| *G06F 13/40* | (2006.01) | |
| *G05B 19/042* | (2006.01) | |
| *G06F 1/3234* | (2019.01) | |
| *G06F 3/06* | (2006.01) | |
| *G06F 13/16* | (2006.01) | |

(52) U.S. Cl.
CPC ..... *G06F 13/4027* (2013.01); *G05B 19/0426* (2013.01); *G06F 1/3275* (2013.01); *G06F 3/061* (2013.01); *G06F 3/0655* (2013.01); *G06F 3/0679* (2013.01); *G05B 2219/21109* (2013.01); *G05B 2219/23345* (2013.01);
(Continued)

(58) Field of Classification Search
CPC ...... G06F 1/3275; G06F 3/061; G06F 3/0655; G06F 3/0656; G06F 3/0661; G06F 3/0679; G06F 13/16; G06F 13/1668; G06F 13/1673; G06F 13/1694; G06F 13/28; G06F 13/382; G06F 13/385; G06F 13/4004; G06F 13/4027; G06F 2219/21109; G06F 2213/0036; G05B 19/0426; G05B 2219/23345; G05B 2219/25257; G05B 2219/25268
See application file for complete search history.

(56) References Cited

U.S. PATENT DOCUMENTS

| | | | | |
|---|---|---|---|---|
| 5,176,525 A | * | 1/1993 | Nierescher | G01R 1/0433 324/756.02 |
| 6,657,426 B1 | * | 12/2003 | Powell | G06F 1/183 365/185.18 |

(Continued)

OTHER PUBLICATIONS

"NuProg-E Engineering UFS/EMMC Programmer User Manual". Version 1.3. DediProg Technology Co., Ltd. Oct. 2016. (Year: 2016).*

(Continued)

*Primary Examiner* — Thomas J. Cleary
(74) *Attorney, Agent, or Firm* — Wong & Rees LLP

(57) ABSTRACT

A system and method of operation of a device programming system includes a protocol emulation layer for translating data storage commands from an initial protocol to the protocol of the programmable devices. The protocol emulation layer simplifies the data access and control of the programmable devices by allowing the reuse of existing code bases for legacy devices.

20 Claims, 14 Drawing Sheets

(52) U.S. Cl.
CPC .............. *G05B 2219/25257* (2013.01); *G05B 2219/25268* (2013.01); *G06F 13/16* (2013.01); *G06F 2213/0036* (2013.01)

(56) References Cited

U.S. PATENT DOCUMENTS

| | | | | |
|---|---|---|---|---|
| 6,732,853 | B1* | 5/2004 | Bolotin | ................... H05K 13/08 |
| | | | | 198/468.2 |
| 7,076,605 | B1 | 7/2006 | Son | |
| 8,301,822 | B2* | 10/2012 | Pinto | ..................... G06F 3/0607 |
| | | | | 710/305 |
| 8,707,104 | B1* | 4/2014 | Jean | ..................... G06F 11/1048 |
| | | | | 714/41 |
| 9,063,531 | B2* | 6/2015 | Johnson | ............... G05B 19/042 |
| 2005/0023560 | A1 | 2/2005 | Ahn et al. | |
| 2006/0107186 | A1 | 5/2006 | Cowell et al. | |
| 2006/0170186 | A1 | 8/2006 | Wu | |
| 2007/0038907 | A1 | 2/2007 | Jeddeloh et al. | |
| 2007/0258288 | A1* | 11/2007 | Amidon | ............... G11C 16/102 |
| | | | | 365/185.17 |
| 2011/0202789 | A1 | 8/2011 | Ong et al. | |
| 2013/0124932 | A1* | 5/2013 | Schuh | .................... G11C 29/08 |
| | | | | 714/718 |
| 2015/0095519 | A1* | 4/2015 | Hu | ........................ G06F 3/0608 |
| | | | | 710/13 |
| 2016/0188910 | A1* | 6/2016 | Nakkiran | ................ G06F 21/72 |
| | | | | 713/192 |
| 2016/0259312 | A1* | 9/2016 | Caley | .................. G05B 19/0426 |
| 2017/0163920 | A1* | 6/2017 | Hwang | ................. H04N 9/045 |
| 2017/0181081 | A1* | 6/2017 | Kim | .................... H04W 52/028 |
| 2019/0114276 | A1* | 4/2019 | Hodes | .................... G06F 13/385 |

OTHER PUBLICATIONS

"Introduction to the Universal Flash Storage Association". White Paper. 2013. Universal Flash Storage Association. (Year: 2013).*
"PSV7000 Owner's Manual". 2014. Data I/O Corporation. (Year: 2014).*
"NuProg-F8 eMMC and UFS Gang Programmer and Duplicator User Manual". Version 1.0. DediProg Technology Co., Ltd. Jun. 2017. (Year: 2017).*
World Intellectual Property Organization, Application No. PCT/US18/60865, International Search Report dated Mar. 4, 2019.

* cited by examiner

DEVICE PROGRAMMING SYSTEM WITH PROTOCOL EMULATION

PRIORITY CLAIM

This application claims priority to Provisional Application No. 62/585,518, filed Nov. 13, 2017, the entire contents of which is hereby incorporated by reference as if fully set forth herein, under 35 U.S.C. § 119(e).

TECHNICAL FIELD

Embodiments relate generally to device programming systems, and, more specifically, to device programming systems with protocol emulation.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Certain operations of electronic circuit board assembly are performed away from the main production assembly lines. While various feeder machines and robotic handling systems populate electronic circuit boards with integrated circuits, the operations related to processing integrated circuits, such as programming, testing, calibration, and measurement are generally performed in separate areas on separate equipment rather than being integrated into the main production assembly lines.

Customizable devices such as Flash memories (Flash), electrically erasable programmable read-only memories (EEPROM), programmable logic devices (PLDs), field programmable gate arrays (FPGAs), and microcontrollers incorporating non-volatile memory elements, can be configured with separate programming equipment, which is often located in a separate area from the circuit board assembly lines.

The systems and sub-assemblies that are manufactured or assembled in bulk on a manufacturing line are generally functionally identical. Such products share similar problems about functionality and operation. Issues manifesting in one device are typically found in all similarly manufactured devices.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. However, the present invention may be practiced without these specific details. In other instances, well-known structures and devices are shown in block diagram form in order to avoid unnecessarily obscuring the present invention.

Embodiments are described herein according to the following outline:
   1.0. General Overview
   2.0. Structural Overview
   3.0. Functional Overview
   4.0. Extensions and Alternatives 1.0. General Overview Approaches, techniques, and mechanisms are disclosed for provisioning programmable devices 118 using an emulation layer. The device programming system can individually program the programmable devices 118 using the emulation layer to translate the data transfer command from one protocol to another.

The programmable devices 118 can include memory chips, circuit boards, and complete electronic devices such as smart phones, media players, or other consumer and industrial electronic devices.

The device programming system can configure individual devices having different interface protocols. By implementing the device programming features at the individual component manufacturing time, operation can be controlled on a device by device basis.

According to an embodiment, by programming the individual devices using the protocol emulation, the devices can be programmed faster and with a higher system throughput.

In other aspects, the invention encompasses computer apparatuses and computer-readable media configured to carry out the foregoing techniques.

2.0. Structural Overview

Figure 1:
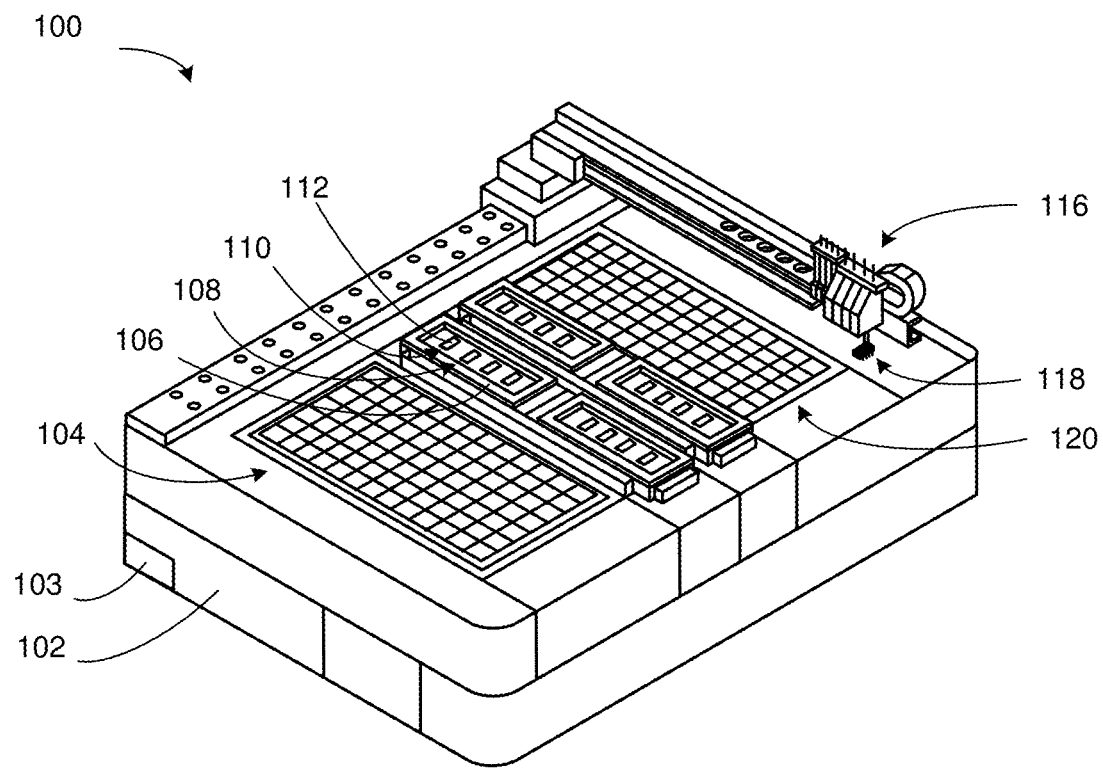
FIG. 1 depicts an isometric view of a device programming system, according to an embodiment.

FIG. 1 illustrates an isometric view of a device programming system 100 according to an embodiment. The device programming system 100 includes a controller 102, an input device receptacle 104, socket adapters 106, destination sockets 108, source sockets 110, a device placement unit 116, programmable devices 118, and an output device receptacle 120.

The device programming system 100 is a system that can configure programmable devices 118. The device programming system 100 can read a whole file at a time and configure the programmable devices 118. Configuring is defined as writing control and data information to the programmable devices 118. Configuring the programmable devices 118 can store memory structure and user data on the programmable devices 118. Configuring can include forming one-time structures such as partitions on the programmable devices 118.

The device programming system 100 can include the controller 102. The controller 102 is a computing unit for controlling the device programming system 100. The controller 102 can include a central processing unit (not shown), a local storage unit 103, a communication interface (not shown), and software (not shown).

The local storage unit 103 is a device for storing and retrieving information. For example, the local storage unit 103 of the device programming system 100 can be a disk drive, a solid-state memory, an optical storage device, any combination thereof, etc. The software is control information for executing on the control unit. The software can be used to control the functionality of the device programming system 100.

The device programming system 100 can include the input device receptacle 104 and the output device receptacle 120. The input device receptacle 104 is a source of the programmable devices 118. For example, the input device receptacle 104 can be a tray that conforms to the Joint Electron Device Engineering Council (JEDEC) standards. The input device receptacle 104 can be used for holding unprogrammed devices.

The output device receptacle 120 is a destination for programmable devices 118 that have been processed. For example, the output device receptacle 120 can be an empty JEDEC tray for holding finished devices.

The device programming system 100 can include the socket adapters 106 having the source sockets 110 and the destination sockets 108. The socket adapters 106 are mechanisms for holding and managing sockets. The sockets are mechanisms for holding and interfacing with the programmable devices 118.

The socket adapters 106 are modular and can be removed from the device programming system 100 to accommodate different socket configurations. For example, the socket adapters 106 can include a latch mechanism (not shown) for attaching to the device programming system 100.

The source sockets 110 and the destination sockets 108 can be used to read or write the programmable devices 118. In general, the source sockets 110 can be used to read one of the programmable devices 118 that has already been programmed. The destination sockets 108 can be used to write new information to one of the programmable devices 118.

The device programming system 100 can include the device placement unit 116. The device placement unit 116 is a mechanism for positioning one of the programmable devices 118 in one of the source sockets 110 or one of the destination sockets 108.

The device placement unit 116 can be implemented in a variety of ways. For example, the device placement unit 116 can be a robotic arm, a pick and place mechanism, or a combination thereof. Although the device placement unit 116 is described as a rail-based positioning system, it is understood that any system capable of positioning one of the programmable devices 118 in the source sockets 110 or the destination sockets 108 can be used.

The device placement unit 116 can position a master device 112 into one of the source sockets 110 on one of the socket adapters 106. The device programming system 100 can receive the master device 112 in the source sockets 110, read the master device 112, and store the information from the master device 112 in the local storage unit 103. The device programming system 100 can then remove the master device 112 from the source sockets 110.

The device placement unit 116 can retrieve one or more of the programmable devices 118 that are blank from the input device receptacle 104 and transport the programmable devices 118 to the source sockets 110 and the destination sockets 108 of the socket adapters 106.

Once the programmable devices 118 are engaged and secured by the socket adapters 106, programming can begin. The device programming system 100 can program the local copy of the information from the master device 112 into the programmable devices 118 in one of the source sockets 110 and the destination sockets 108.

Once programming is complete, the device placement unit 116 then transports the programmable devices 118 that have been programmed to the output device receptacle 120. The device placement unit 116 can transport any of the programmable devices 118 that have errors to a reject bin (not shown).

Figure 2:
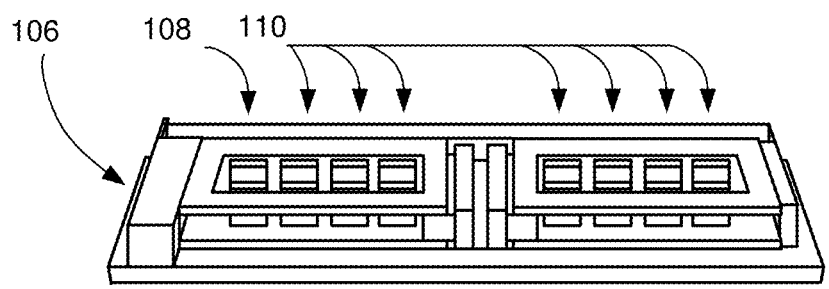
FIG. 2 depicts an example of a programmer of a device programming system, according to an embodiment.

FIG. 2 illustrates an example of the socket adapters 106. The socket adapters 106 can include one or more sockets for retaining the programmable devices 118. The socket adapters 106 can include the source sockets 110 and the destination sockets 108. For example, The socket adapters 106 can have a variety of configuration. For example, the socket adapters 106 can include one of the source sockets 110 and three of the destination sockets 108. In another example, one of the socket adapters 106 can include four destination sockets 108 for configuring the programmable devices 118. Although the socket adapters 106 are shown with four sockets, it is understood that the socket adapters 106 any number and combination of the source sockets 110 and the destination sockets 108.

The source sockets 110 are for reading and writing the programmable devices 118. The source sockets 110 can be used to read from the master device 112, which can be pre-programmed device. Although the source sockets 110 are used to read information from the master device 112, the source sockets 110 can also be used to write information to the programmable devices 118 that are unprogrammed. The destination sockets 108 are used to configure the programmable devices 118 that are blank or unprogrammed.

Figure 3:
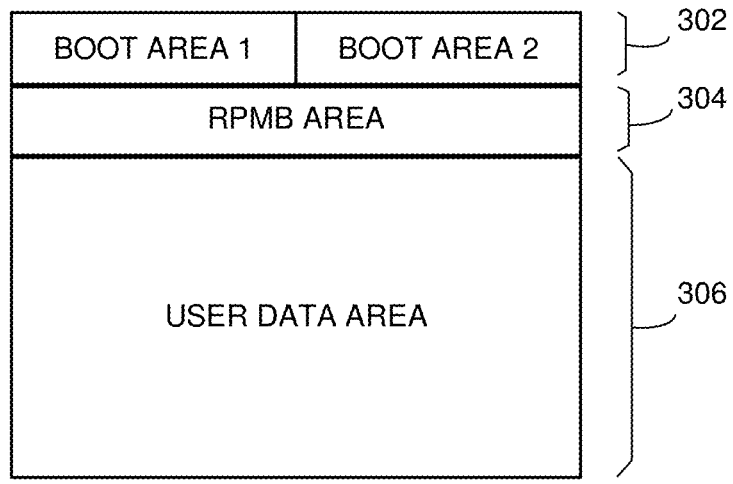
FIG. 3 depicts a first exemplary memory configuration of a master device of a device programming system, according to an embodiment.

FIG. 3 illustrates a first exemplary memory configuration of the master device 112. The master device 112 can include boot partitions 302, replay protected memory block partitions 304, and a user data area 306, or a combination thereof.

The master device 112, such as an embedded multimedia card (eMMC) flash memory device, can have different memory configurations according to the targeted purpose of the device. The master device 112 can store different types of information.

The master device 112 can include the boot partitions 302. The boot partitions 302 are dedicated memory areas of the master device 112 used to hold information related to booting the master device 112. The master device 112 can include one or more of the boot partitions 302.

The master device 112 can include the replay protected memory block partitions 304. The replay protected memory block partitions 304 are section of memory that can be configured to have enhanced security attributes. For example, the replay protected memory block partitions 304 can be configured to be read-only.

The replay protected memory block partitions 304 are for managing data in an authenticated and replay-protected manner. The replay protected memory block partition 304 can include an authentication key (not shown) for protecting access to the replay protected memory block partitions 304.

The master device 112 can include the user data area 306. The user data area 306 is a portion of memory for the master device 112 for storing user information. The user data area 306 can be used to store user-specific data.

Figure 4:
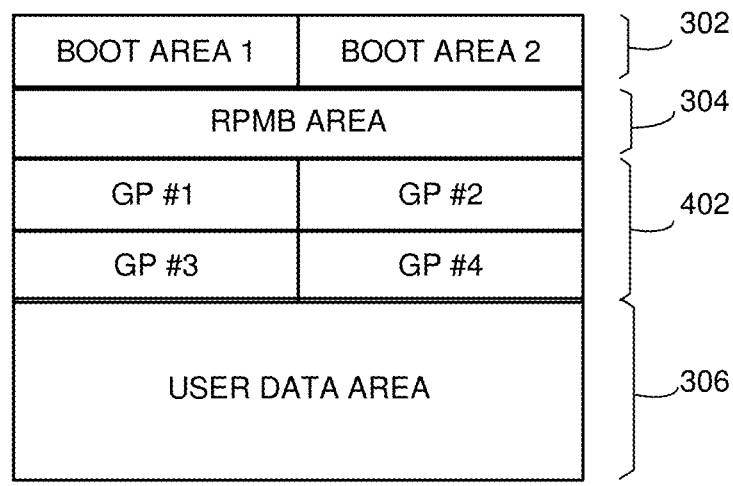
FIG. 4 depicts an example of a data device of a device programming system, according to an embodiment.

FIG. 4 illustrates a second exemplary memory configuration of the master device 112. The master device 112 can include the boot partitions 302, the replay protected memory block partitions 304, general purpose area partitions 402, the user data area 306, or a combination thereof.

The memory configuration of the master device 112 is shown after partitioning the user data area 306. The master device 112 can use the different partitions to store different types of information.

The master device 112 can include the general-purpose area partitions 402 formed in the user data area 306. The general-purpose area partitions 402 are used to store general purpose data.

The general-purpose area partitions 402 can have a variety of configurations. For example, the master device 112 can include up to four of the general-purpose area partitions 402.

Figure 5:
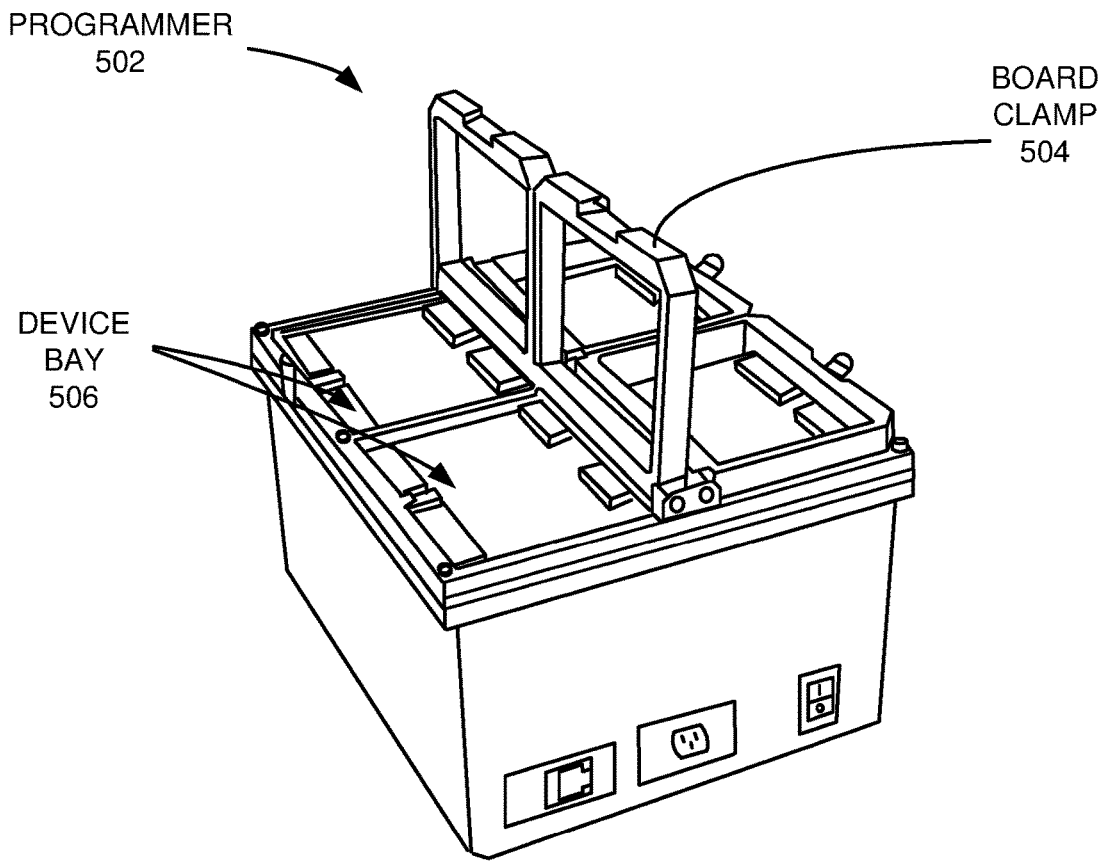
FIG. 5 depicts an example of a programmer of a device programming system, according to an embodiment.

FIG. 5 illustrates an example of a programmer 502. The programmer 502 is a component for configuring and provisioning the programmable devices 118. The programmer 502 can include a board clamp 504 for securing a UFS (Universal Flash Storage) baseboard to the programmer 502. The programmer 502 can be used to initialize, test, and program the programmable devices 118, such as a UFS memory device.

The programmer 502 can have a variety of configurations. For example, the programmer 502 can be configured with four or eight device bays 506 for attaching the UFS memory devices. Each of the device bays 506 can accept the UFS baseboard 602 which can be secured with the board clamp 504.

The UFS baseboard 602 is an electronic module for mounting the UFS socket adapter. The UFS socket adapter is an electromechanical component for securing and interfacing with the UFS memory device.

The UFS baseboard 602 can include one or more socket connectors for attaching the socket adapter to the UFS baseboard 602. The socket connectors can accept mated pins from the socket adapter to attached to the socket adapter to the UFS baseboard 602.

The programmer 502 can include a protocol emulation layer to control the programmable devices 118 using a non-native protocol. For example, the programmer 502 can be configured as an eMMC protocol programmer 502, but use the protocol emulation layer to convert the eMMC commands to UFS commands. This can allow access to large capacity devices. The UFS memory devices can deliver faster response time, short boot times, and faster launch time for applications compared to eMMC memory devices. The UFS protocol provides sequential read/write speeds comparable to solid-state drives while combining it with the low power consumption of eMMC. The UFS memory devices can read data more than 3 times faster than eMMC with 2× the storage capacity.

The UFS memory devices can have different environmental operation ranges for different grades of devices. For example, consumer grade devices can operate between 25° C. and 85° C. Industrial grade devices can operate between −40° C. and 105° C. Automotive grade 3 devices can operate at −40° C. to 85° C. And Automotive Grade 3 devices can operate at −40° C. to 105° C.

Preprogramming the programmable devices 118 improves operation performance. Preprogramming allow faster data transfer and reduced programming time. Detection of component level programming errors at the preprogramming phase can reduce the impact of device replacement. Preprogramming can improve security by configuring the programmable devices 118 in a secure environment within a manufacturing facility.

Figure 6:
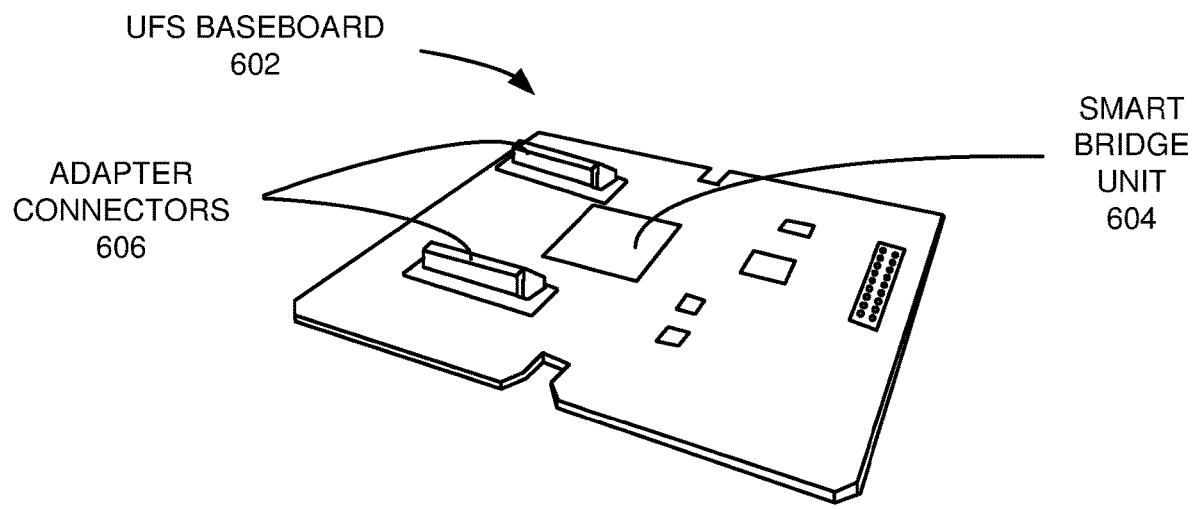
FIG. 6 depicts an example of a UFS baseboard of a device programming system, according to an embodiment.

FIG. 6 illustrates an example of the UFS baseboard 602. The UFS baseboard 602 is a component for interfacing between the programmer 502 and the programmable devices 118 attached to the socket adapters 106.

The UFS baseboard 602 can include the adapter connectors 606 for mounting the socket adapter. The adapter connectors 606 are electromechanical components to provide connectivity to the socket adapters 106. The socket adapters 106 are used to mount the programmable devices 118 102.

The socket adapters 106 can have a variety of configurations. For example, the socket adapters 106 can be configured to receive eMMC components, UFS components, MMC devices, or other similar memory devices.

The UFS baseboard 602 can include the smart bridge unit 604. The smart bridge unit 604 is a component that can facilitate the communication between two different device types and protocols. For example, the smart bridge unit 604 can be used to translate commands and data between an eMMC interface and a UFS memory device.

The smart bridge unit 604 can have a variety of configurations. In one embodiment, the smart bridge unit 604 can be a field programmable gate array component that has been programmed to translate the eMMC commands to SCSI commands for communicating with the UFS memory devices.

The UFS baseboard 602 can include other data and logic components to implement additional functionality. For example, the UFS baseboard 602 can include buffer memory to store data being transferred between the programmer 502 and the programmable devices 118. The buffer memory can be attached directly to the UFS baseboard 602 and be utilized by the smart bridge unit 604 when transferring data to compensate for different data transfer rates.

Figure 7:
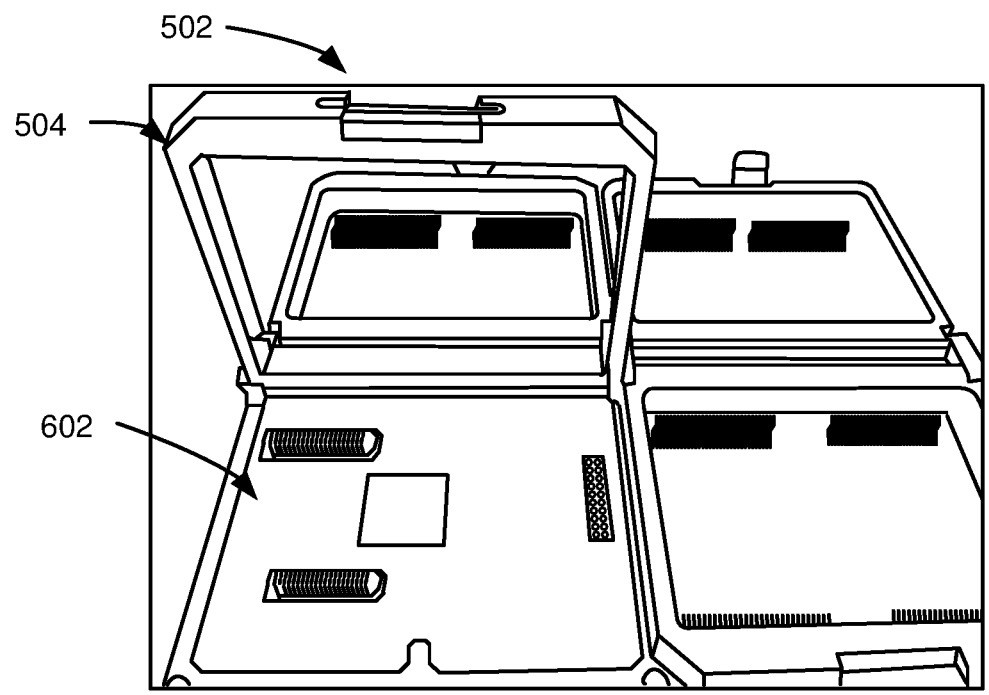
FIG. 7 depicts a top view of the programmer.

FIG. 7 illustrates a top view of the programmer 502. The programmer 502 is configured with four of the device bays 506 each having the board clamp 504.

The programmer 502 includes the UFS baseboard 602 mounted in one of the device bays 506 with the board clamp 504 open. The programmer 502 also includes three of the device bays in an empty configuration.

Figure 8:
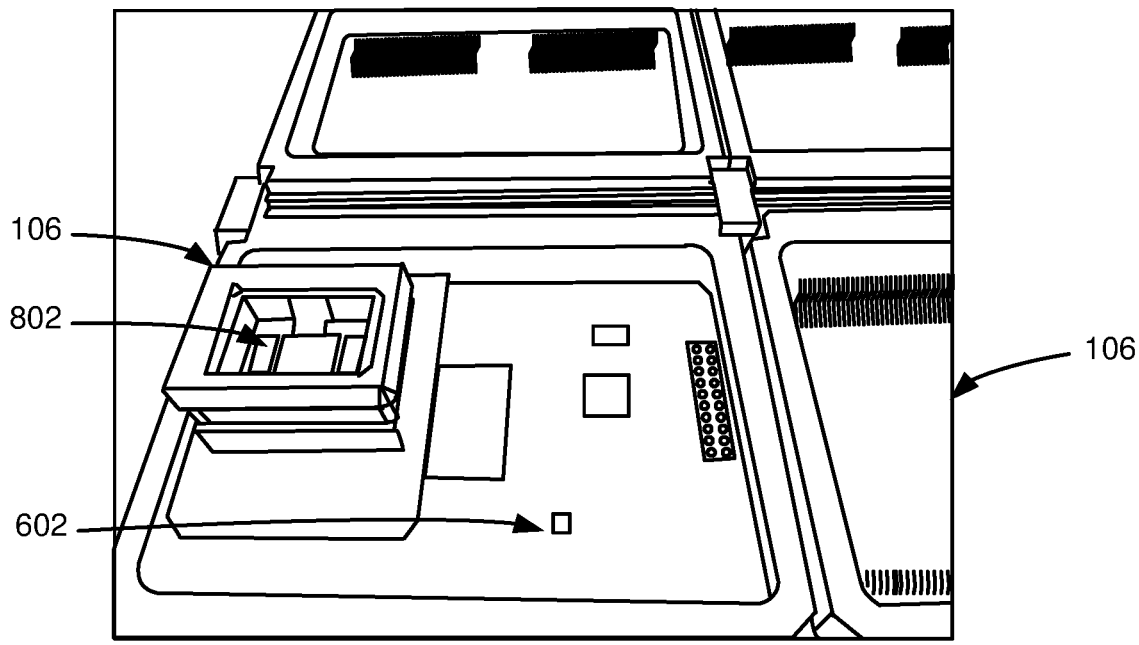
FIG. 8 depicts a top view of the socket adapter.

FIG. 8 illustrates a top view of one of the socket adapters 106. The socket adapters 106 are mounted on the adapter connectors 606 of the UFS baseboard 602. The socket adapters 106 are modular and can be changed to accommodate the type of devices being programmed. For example, the socket adapters 106 can be UFS sockets 802 for connecting to UFS memory devices.

Figure 9:
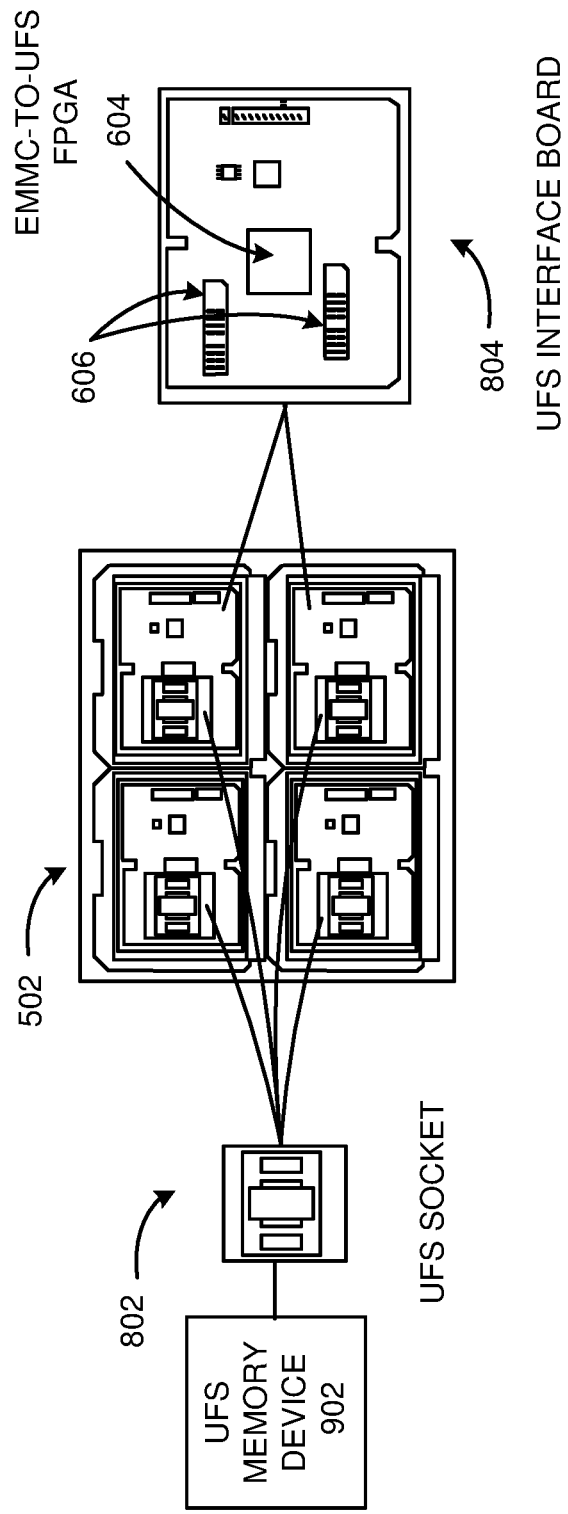
FIG. 9 depicts an overview of the device programming system in another embodiment.

FIG. 9 illustrates an overview of the device programming system in another embodiment. The device programming system includes the programmer 502 for initializing, testing, and programming the programmable devices 118. The programmable devices 118 are memory storage devices such as UFS memory devices, eMMC devices, or other non-volatile memory devices.

The programmer 502 is an intelligent system that can initialize, test and program the programmable devices 118. In an illustrative example, the programmer 502 can receive a programming job containing control information and content data to be programmed into the programmable devices 118. The programmer 502 can then use the information in the programming job to program the content data into the programmable devices 118.

The programmer 502 can include one or more device bays used to mount the programmable devices 118. Each of the device bays can receive an interface board 804 for connecting and configuring the programmable devices 118.

The device programming system can include the programmer 502 for configuring the programmable devices 118. The programmer 502 can have one or more of the device bays for interfacing with the programmable devices 118.

The interface boards 804 provide logical and physical connectivity between the programmer 502 and the programmable devices 118. The interface boards 804 are mounted in the device bays and secured with the board clamp 504.

Each of the interface boards 804 can receive one or more of the socket adapters 106. The socket adapters 106 can physically connect to the programmable devices 118.

The socket adapters 106 can have a variety of configurations. The socket adapters 106 are customized to each type of the programmable devices 118. For example, the UFS socket adapter can be used to mount one or more of the UFS memory devices. The interface boards 804, which can be the UFS baseboard 602s, are intelligent components for interfacing between different device protocols.

In an illustrative example, the interface boards 804, such as a UFS interface board, can include a smart bridge unit 604 to provide an interface between two different device protocols. The smart bridge unit 604 can be a FPGA device configured to translate commands for an eMMC device to commands for controlling a UFS memory device.

Using the interface boards 804 and the smart bridge unit 604 to provide an eMMC interface to the UFS memory devices 1014 improves operational efficiency by enabling the reuse of existing software to initialize, test, configure, and program the UFS memory devices.

Figure 10:
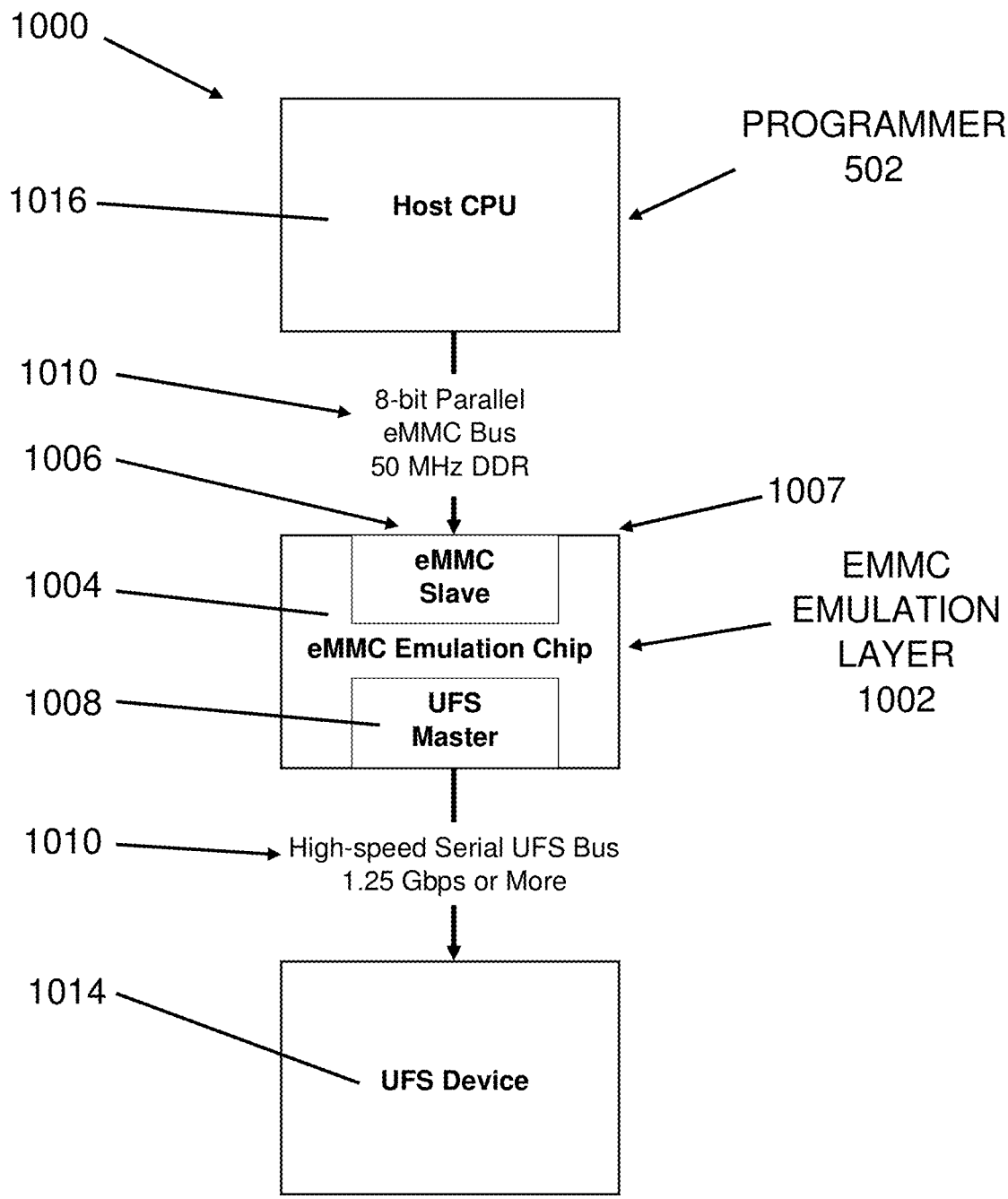
FIG. 10 depicts a first block diagram of the device programming system in a further embodiment.

FIG. 10 illustrates a first block diagram of the device programming system 1000 in a further embodiment. The device programming system can be configured to allow the programmer 502 to initialize, test, and program the programmable devices 118.

The device programming system 1000 can have a variety of configurations. For example, the device programming system can include the programmer 502 coupled to the UFS memory device via an eMMC emulation layer 1002 using an eMMC interface chip. This can allow the UFS memory device to be accessed from the programmer 502 via the eMMC interface.

The eMMC emulation layer 1002 can include an eMMC emulation chip 1004 having an eMMC interface 1007, such as an eMMC slave interface, for communicating with the programmer 502 and an UFS master interface 1008 for communicating with the UFS memory device 1014.

The eMMC emulation chip 1004 can have a variety of configurations. For example, the eMMC emulation chip 1004 can be a field programmable gate array (FPGA) device programmed to translate the eMMC commands to a subset of the SCSI commands used to access the UFS memory device.

The eMMC emulation layer 1002 can receive the eMMC commands from the programmer 502 via an eMMC bus 1012. The eMMC emulation layer 1002 can then translate the eMMC commands to SCSI commands and send them to the UFS memory device over a UFS bus 1010. In one example, the eMMC bus 1012 can be an 8-bit parallel bus operating at 50 megahertz (MHz) clock frequency, while the UFS bus 1010 can operate at 1.25 gigabits per second (Gbps) or higher.

The eMMC emulation layer 1002 can exchange the data between the UFS memory device and the eMMC bus 1012. Because of the differences in speed and overall data throughput between the eMMC and the UFS bus 1010ses, the eMMC emulation layer 1002 can provide a data buffering unit to perform flow control during data transfer operations.

Providing the eMMC emulation layer 1002 to allow the use of existing bodies of software for programming and using eMMC Flash memory for data storage can reduce development time and provide a structured pathway to the adoption of other data protocols. However, the maximum memory capacity of eMMC memory devices produced by major semiconductor vendors is 128 GB. For applications requiring more than 128 GB of memory, the next generation of memory technology, such as UFS memory devices, is required, however converting an eMMC system to use UFS memory devices would normally require developing an all new software stack before the intended application can be realized.

By implementing the eMMC emulation layer 1002 between the programmer 502 and the UFS memory device, programmer 502 can communicate using eMMC commands communicate with the UFS memory device. The eMMC emulation layer 1002 translates the eMMC commands into UFS commands, allowing existing software to be used with larger memory sizes without significant engineering work. This allows a gradual transition from eMMC memory devices to UFS memory devices. The eMMC emulation layer 1002 allows existing software to be used with larger and faster memories, bridging the development gap while software solutions for the new UFS standard are developed.

Figure 11:
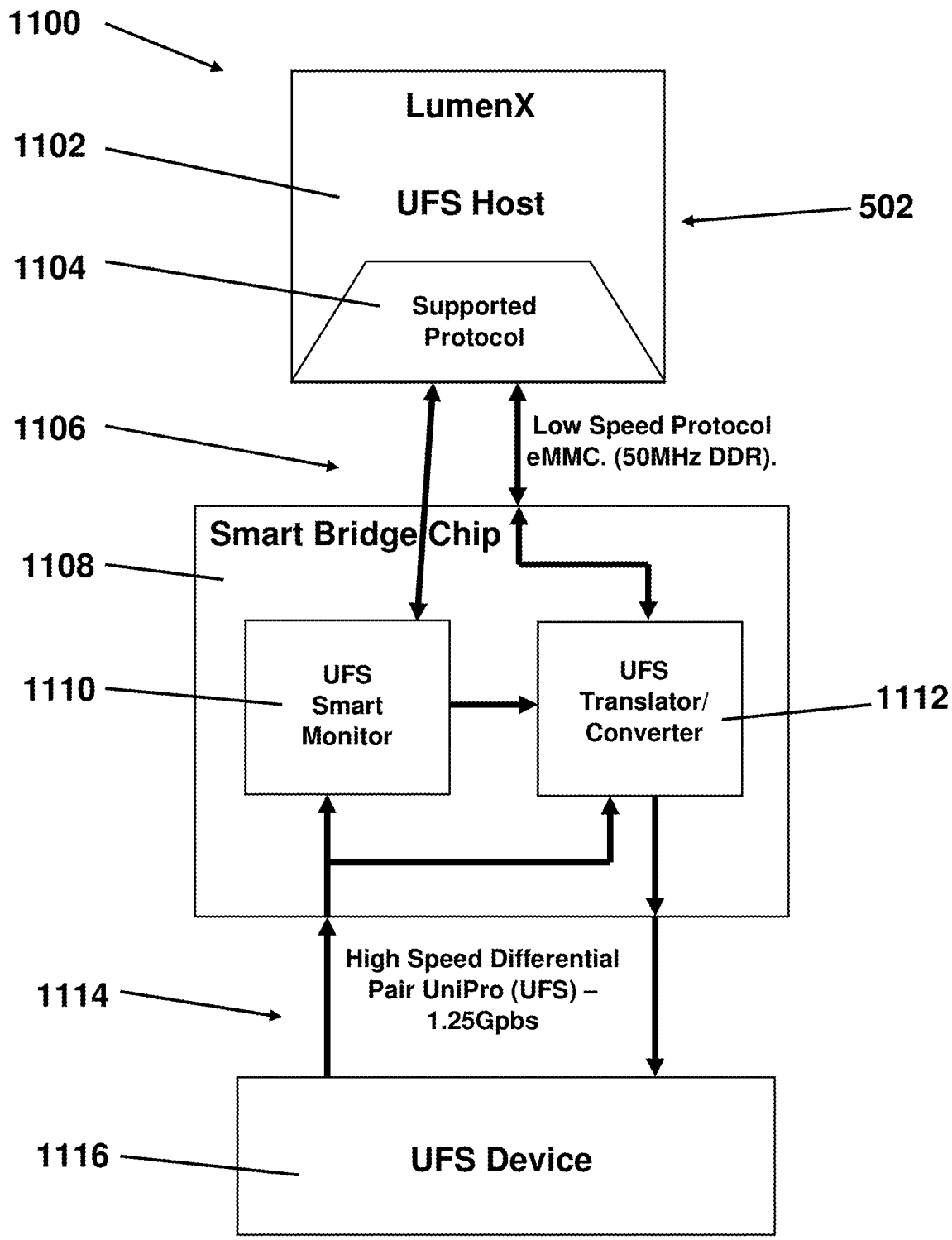
FIG. 11 depicts a second block diagram of the device programming system in a further embodiment.

FIG. 11 illustrates a second block diagram of the device programming system 1100 in a further embodiment. The device programming system 1100 can be configured to allow a UFS host 1102, such as the programmer 502, to initialize, test, and program the high-speed programmable devices 118 using a lower speed protocol interface, such as an eMMC protocol interface 1104.

The device programming system 1100 1100 can include the programmer 502, the smart bridge unit 1108, and the UFS device 1116. The programmer 502 can be coupled to the smart bridge unit 1108, such as a smart bridge chip. The smart bridge unit 1108 can be connected to the UFS device 1116.

The programmer 502 can include a protocol interface, such as an eMMC interface. The protocol interface can operate using a lower speed protocol, such as a 50 MHz dual data rate (DDR).

The device programming system 1100 can include the smart bridge unit 1108 between the programmer 502 and the UFS device 1116. The smart bridge unit 1108 is responsible for translating between different data communication protocols. For example, the smart bridge unit 1108 can translate eMMC commands from the programmer 502 and communicate with the programmable devices 118 using the UFS protocol.

The smart bridge unit 1108 can be part of one of the interface boards 804 mounted in one of the device bays on the programmer 502. The interface boards 804 can be a smart adapter, a breakout board, a baseboard, an adapter board, or other similar types of devices.

The smart bridge unit 1108 can have a variety of configurations. For example, the smart bridge unit 1108 can include a UFS translator module 1112 for converting the eMMC commands to UFS commands and a UFS smart monitor module 1110.

The UFS translator module 1112 can translate commands from eMMC protocol to the protocol used by the UFS devices 1116. The UFS translator module 1112 can receive the eMMC commands from the programmer 502 and convert them into SCSI commands. The SCSI commands are then sent to the UFS device 1116 over the UFS bus 1114. The UFS bus 1114 can include a UFS interface supporting high speed differential pair communication, such as Unified Protocol (UniPro). The UFS bus 1114 can operate at a data rate of 1.25 Gbps or faster.

The smart bridge unit 1108 can control the flow of data between the programmer 502 and the UFS device 1116. The smart bridge unit 1108 can also buffer the flow of data to compensate for the difference in data transfer speed.

When a write command is processed by the smart bridge unit 1108, the data can be transferred from the programmer 502 to the UFS device 1116. The eMMC protocol is generally slower than the UFS protocol, so the transfer of data requires minimal data flow control.

When a read command is processed by the smart bridge unit 1108, the device programming system 1100 provides data buffering and data flow control to accommodate the higher data transfer speeds of the UFS protocol. The smart bridge chip can use the UFS smart monitor module to control the data flow rate. The data flow from the UFS device 1116 can be monitored by the smart monitor. If the data flow reaches the maximum capacity of the eMMC protocol, then the UFS smart monitor can control the UFS translator module to reduce the data flow rate.

Implementing some of the high level UFS functionality outside of the UFS device 1116s can improve system performance. For example, implementing the UFS smart monitor module in the smart bridge unit 1108 can improve data throughput by controlling the data flow to the programmer 502. Implementing the UFS translator module in the smart bridge unit 1108 can allow eMMC support without modifying the UFS device 1116s.

To accommodate the UFS device 1116s, the smart bridge unit 1108 can allow the programmer 502 to interface with the UFS protocol. Essentially, the programmer 502 provides an eMMC interface to the smart bridge unit 1108 which then translates and reformats the provided data to communicate with the UFS device 1116.

The delay caused by the translation of these commands between the UFS device 1116 and the programmer 502 can be time consuming and limits the data throughput. Some of the delay can be due to the requirement of needing to send status and confirmation info back and forth between every transaction.

The delay can be reduced by offloading the status and confirmation communication overhead into the UFS smart monitor module. For example, some UFS initialization and discovery processes can be implemented within the UFS smart monitor. Thus, although the programming is the USF host/master, the USF smart monitor controls the data flow control and signaling overhead. This allows for timely responses and removes the delay from translating and sending commands/requests back and forth between the UFS device 1116 and the UFS host 1102.

The UFS smart monitor module can implement the following functionality. The UFS smart monitor can control the data flow control between the UFS smart bridge unit 1108 and the UFS device 1116. The UFS smart monitor can control the discovery sequence and capability exchange and acknowledges all received frames.

The UFS smart monitor module can auto-respond to NOP-OUTs with NOP-Ins. NOP-OUTs are used to confirm a link is still active/open. The UFS smart monitor can also auto respond to power mode changes.

The UFS translator module can implement the following functionality. The UFS translator module is responsible for the data flow control for the data transfer between the programmer 502 and the smart bridge unit 1108. The UFS translator module can assemble the UFS frames and the eMMC frames.

The UFS translator module can calculate and insert cyclic redundancy checks (CRC) for both the UFS and eMMC frames. The UFS translator module can reformat the bulk data for UFS and eMMC interfaces.

The use of the smart bridge layer allows for the centralized host to remain within the programmer 502 and allows the reuse existing hardware and software, but at the same time allows for an expansion to other technologies without losing data through-put.

Figure 12:
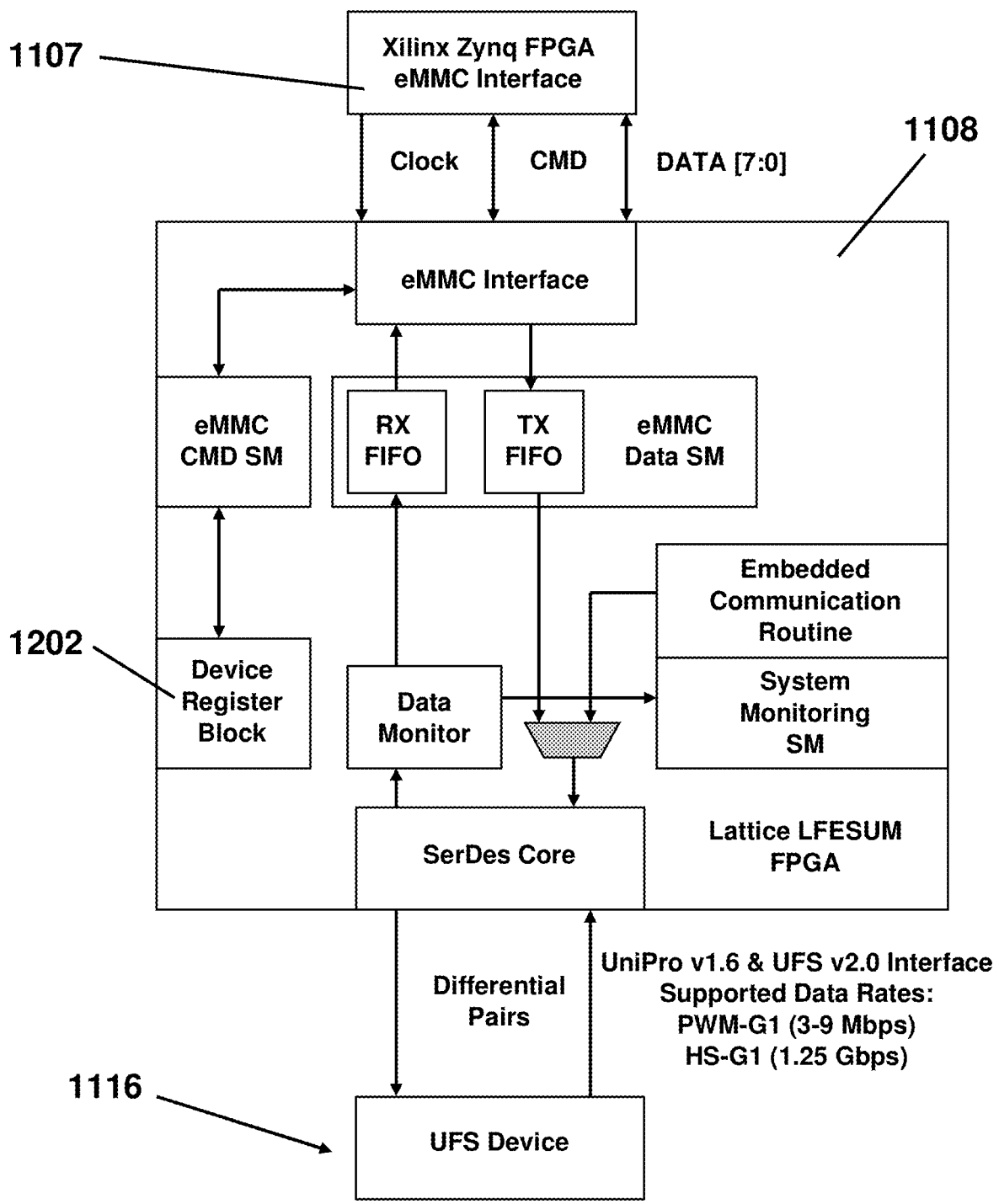
FIG. 12 depicts an exemplary block diagram of the smart bridge unit 604 and the UFS memory device.

FIG. 12 illustrates an exemplary block diagram of the smart bridge unit 1108 and the USF memory device 1116. The smart bridge unit 1108 can be used to manage the data flow between the programmer 502 and the USF memory device 1116.

The smart bridge unit 1108 can support the electrical characteristics and the data speeds of UFS devices. The smart bridge unit 1108 can transmit data at multiple data speeds; a low-speed of 3-9 Mbps and higher-speeds of 1.25 Gbps. 2.5 Gbps, and 5 Gbps in addition to the previously mentioned data rates.

The smart bridge unit 1108 can utilize a variety of components. For example, the smart bridge unit 1108 can include a Lattice LFESUM FPGA. The programmer 502 can include a Xilinx Zynq FPGA communicating through the Lattice LFESUM FPGA to the USF memory devices 1116.

Regarding data flow control, the data for the USF memory device 1116 can be queued in first-in, first-out (FIFO) buffers. For example, the smart bridge unit 1108 can include an eMMC data support module having a receiver FIFO (RX FIFO) and a transmit FIFO (TX FIFO). The FIFO buffers can be controlled by the UFS data monitor module.

The data can be transmitted to and from the USF memory devices 1116 in 4K bursts or bursts of other sizes. The data can be transferred out of the RX or TX FIFO if 4K of data is present. The data in the TX FIFO can contain the packet data. Any packet headers and/or control symbols, and CRCs can be injected into the data packet. This can be performed by the FPGA.

A device register can be used in order to identify the type of frame being transmitted. All status and non-data packets can be assembled and sent by the FPGA, the packet type Device registers can be used in order to transmit a frame of this type. The device registers can be used to contain the returned status info. These registers can be accessed via the eMMC interface using cmd19 (Device Register Read).

The USF memory devices 1116 support a range of high and low frequencies and data communication rates. The device programming system 1100 can also support different versions of the UFS protocol including PWM-G1, HS-G1, and HS-G2. The device programming system 1100 can also support a Lattice LFE5UM-45F device.

The device programming system 1100 can support portions of the UniPro interface v1.6 and UFS v2.0 protocols. The device programming system can also support a subset of the eMMC protocol. In a specific example, the device programming system can be used to interface between the UFS Lattice and the LumenX Xilinx FPGA.

The USF memory device 1116 can communicate with the smart bridge unit 1108 using a variety of interfaces, such as a UniPro v1.6 interface, a UFS 2.0 interface, or other similar interfaces.

The UniPro interface and the UFS interface are unidirectional differential paired signals. Data transmission can be a single lane or in buses. The interfaces can support single differential point-to-point data pairs. The communication is based on low-swing, DC-coupled, differential signal. The UniPro interface and the UFS interface utilize the M-PHY protocol, which has two different signals schemes for data transmission. These two signaling schemes are called Non-Return-to-Zero (NRZ) and Pulse Width Modulation (PWM). For example, the PWM mode can be used in LS-MODEs and the NRZ mode can be used in HS-MODEs.

For NRZ, each bit is represented by a period of either DIF-P or DIF-N, corresponding to binary 1 or binary 0, respectively. All bits are directly concatenated and have equal length.

For PWM, each bit period contains two edges, where the falling edge is a fixed position and the rising edge is modulated. By default, the USF memory devices 1116 can boot into the PWM-G1 mode at powerup.

The data can be transmitted using 8b10b encoding in order to make sure the transmitted data is DC-balanced. This encoding style also allows for separate control and data symbols. Data symbols are encoded with a 5b6b and a 3b4b sub-block encoder. The byte defined as, HGFEDCBA, shall be encoded by bits HGFED and CBA separately using the mentioned 5b6b and a 3b4b encoders, respectively.

The device programming system can handle UFS device discovery and initialization. A wake-up and discovery sequence is required to initiate communication with UFS devices. The initialization Phase is started by driving both signals on the differential pair to '0' to wake up the device. Next DIF-N needs to be transmitted in order to activate the device and a LINE-RESET (extended DIF-P) needs to be sent.

The Link startup sequence then proceeds by sending BURSTs of data containing trigger conditions. These trigger conditions are used to establish communication and to establish the number of Lanes available between the devices and the Lane numbers. The system can include one or more lanes as needed.

The UFS interface board can include additional off-chip RAM storage that can be used as buffer space for flow control. The additional memory can improve data transfer performance by providing additional buffer space.

The USF memory devices 1116 use a sliding-window flow control method, where up to 127 packets (up to ~34 kB of data) can be outstanding at once. To prevent a round trip back to the programmer 502, these outstanding packets could be buffered in the RAM to help reduce latency. These can also be buffered in the RAM of the smart bridge unit 1108.

In addition, the smart bridge layer 1002 can be configured with two or more of the UFS sockets 802. Using a ping-pong technique, the data can be buffered in the RAM and use UFS' greater speed to power device 1, program it, power it down, then power device 2, program it, and power it down before the programmer 502 provides the next block of data.

Finally, the additional RAM memory on the interface boards 804 could be used to enable a local verification strategy. The data provided from the programmer 502 can be stored into the RAM, then programmed to the UFS device, then read back, and then compared with the stored data. This additional validation can improve performance by eliminating a remote bus transaction by leveraging the greater speed of the UFS memory device 1116.

3.0. Functional Overview

Figure 13:
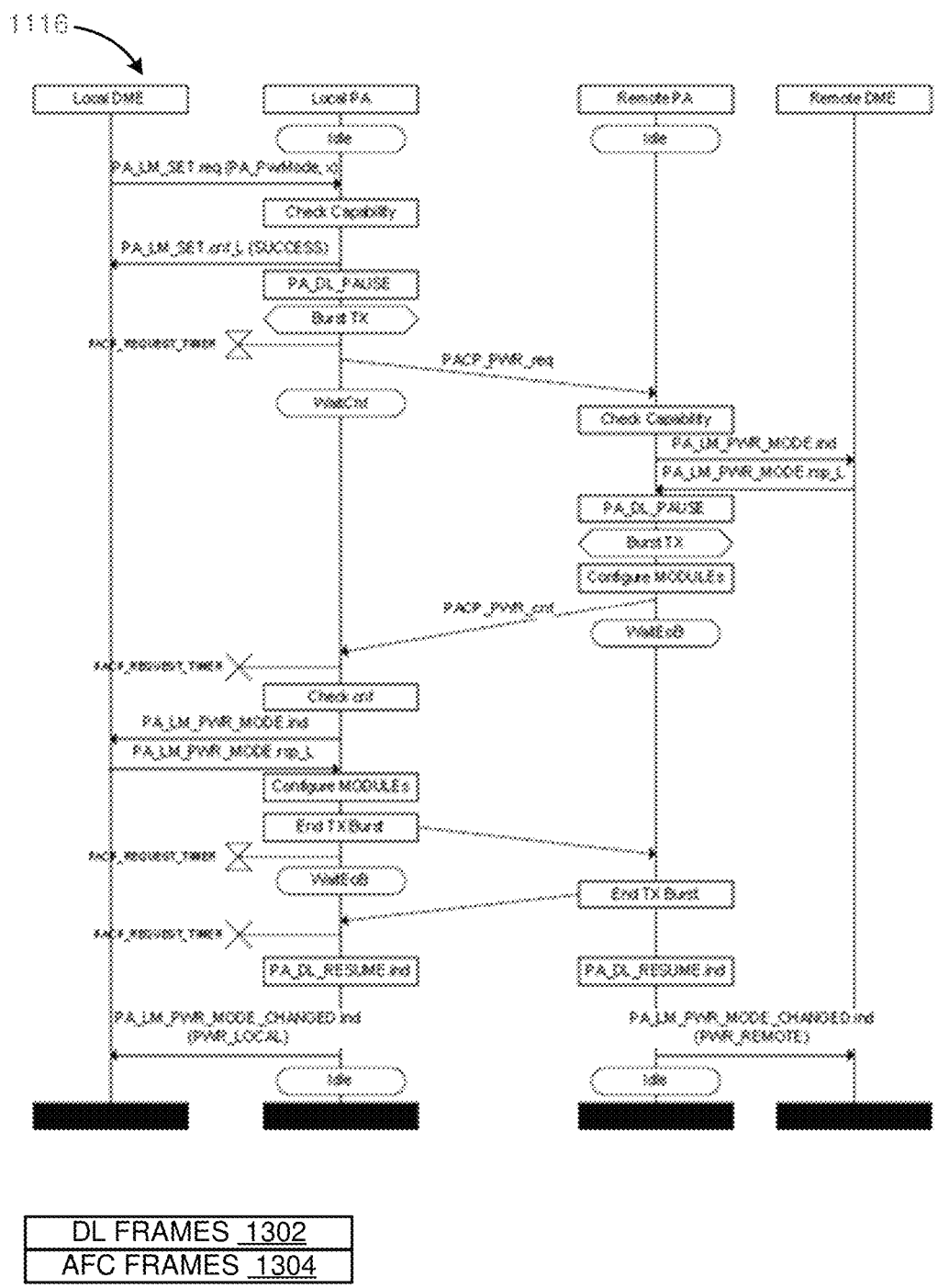
FIG. 13 depicts an exemplary power change mode request.

FIG. 13 illustrates an exemplary power change mode request. A data burst can contain several PHY Adapter Control Protocol (PACP) or Data Link (DL) frames within it. They can be separated by filler control symbols and frame with start of file (SOF) and end of file (EOF) markers. Each frame can contain a separate and independent CRC. PACP request frames induce a confirmation frame from the recipient of the PACP request.

Multiple DL frames 1302 can be sent within a BURST, but some configurations do not elicit the same type of hand shaking required by PACP frame transactions. The DL frames 1302 can elicit AFC frames 1304, NAC frames (negatively acknowledged), and response frames. An AFC frame 1304 (Acknowledgement and Flow Control) can be returned for each individual DL frame 1302 or for a set of DL frames 1302 that were transmitted and acknowledged. The AFC frame 1304 contains the Frame Sequence number of the latest acknowledged frame, and counts as an acknowledgment for all the preceding frames in the case of set acknowledgment.

The requirement of transmitting AFC frames 1304 for DL reception can be solely controlled by the Lattice FPGA. NAC frames require the host to retransmit any and all frames sent from the previous AFC. Any lost frames being sent to the UFS device can be considered a complete transaction failure, meaning the entire transaction needs to be restarted from the start. Once data leaves the buffers, such as the Lattice FIFOs, they are no longer available.

There is a limit to how much data can be sent and that is controlled by a Credit Summary (Flow Control). The number of credits a receiver has is sent within the AFC frames. This allows the programmer 502 to know whether more data can be sent or if a delay is required. The response frames can be the responsibility of the Lattice FPGA to transmit back to the UFS device. For example, a NOP-OUT frame can elicit an AFC and a NOP-IN response frame. NOP-OUTs are used to confirm a link is still active/open.

The credit summary is present in the AFC frames 1304 and as the AFC frames 1304 are not expected unless data is transferred, an initial Credit Exchange is required. The initial Credit Exchange occurs after the capability exchange.

The Credit Exchange constitutes the transmission of two of the AFC frames 1304, one with a priority of TC1 and another with the priority of TC0. The TC1 AFC can include info to disable its use downstream. The AFC frames 1304 are also initialized with a frame sequence of 31 during the initial exchange, so that the frame sequence auto-rolls over after transmission. This syncs the frame sequence count of both host and UFS device to Frame sequence 0, after the credit exchange.

The Lattice FPGA can manage the flow control in communicating with the UFS device. No PACP or DL frames can be allowed to be transferred until a Discovery sequence is run.

Figure 14:
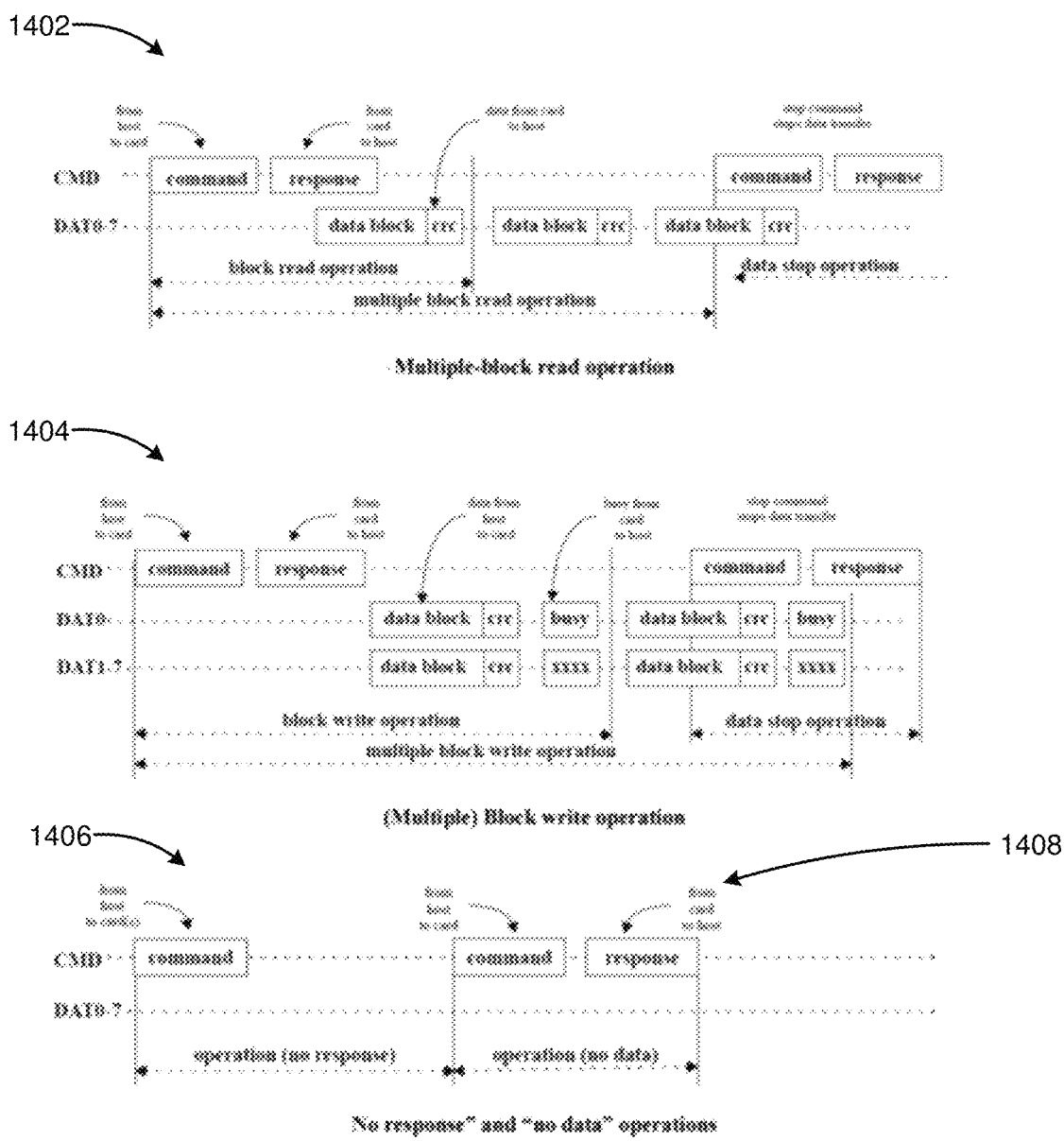
FIG. 14 depicts examples of the eMMC protocol commands.

FIG. 14 illustrates examples of the eMMC protocol commands. The commands can include multiple block read operations 1402, multiple block write operations 1404, no response 1406, and no data operations 1408.

The eMMC protocol supports a source synchronous interface. The eMMC protocol is used to transfer information between the programmer 502 and the smart bridge unit 604. The eMMC interface includes a clock, command/response line, and an 8-bit data bus. The command line and data bus are bi-directional buses.

The eMMC data transfers are block-oriented and are composed of command, response, and data block structure tokens. Operations always contain a command and response token. In addition, some operations have a data token. Command/Response and data tokens are succeeded by CRC bits. Command/Response tokens can utilize a CRC7 with the polynomial $x^7+x^3+1$. Data tokens utilize a CRC16 with the polynomial $x^{16}+x^{12}+x^5+1$.

Command and Response tokens can be sent via the command line (CMD) and Data can be sent via the 8-bit data bus. The block write operation 1404 uses a simple busy signaling of the write operation duration on the data (DAT0) line.

The command token is preceded by a start bit ('0') and succeeded by an end bit ('1'). The total length is 48 bits. Each command contains a 7-bit CRC. See FIG. 5. The contents of a command are defined in Table 1.

The eMMC protocol has five different response types. In one embodiment, the R1 type is supported because the length and data bits format is identical to the 48-bit command token. The eMMC command token format and command list are available from a variety of sources.

The data tokens can have a format where the data tokens are preceded by a start bit ('0') and succeeded by an end bit ('1'). The total length is dependent by the Block Size. By default, the data block size can be 512 bytes. However, other block sizes are supported. Each lane of the 8-bit data bus can contain an independent 16-bit line CRC.

Figure 15:
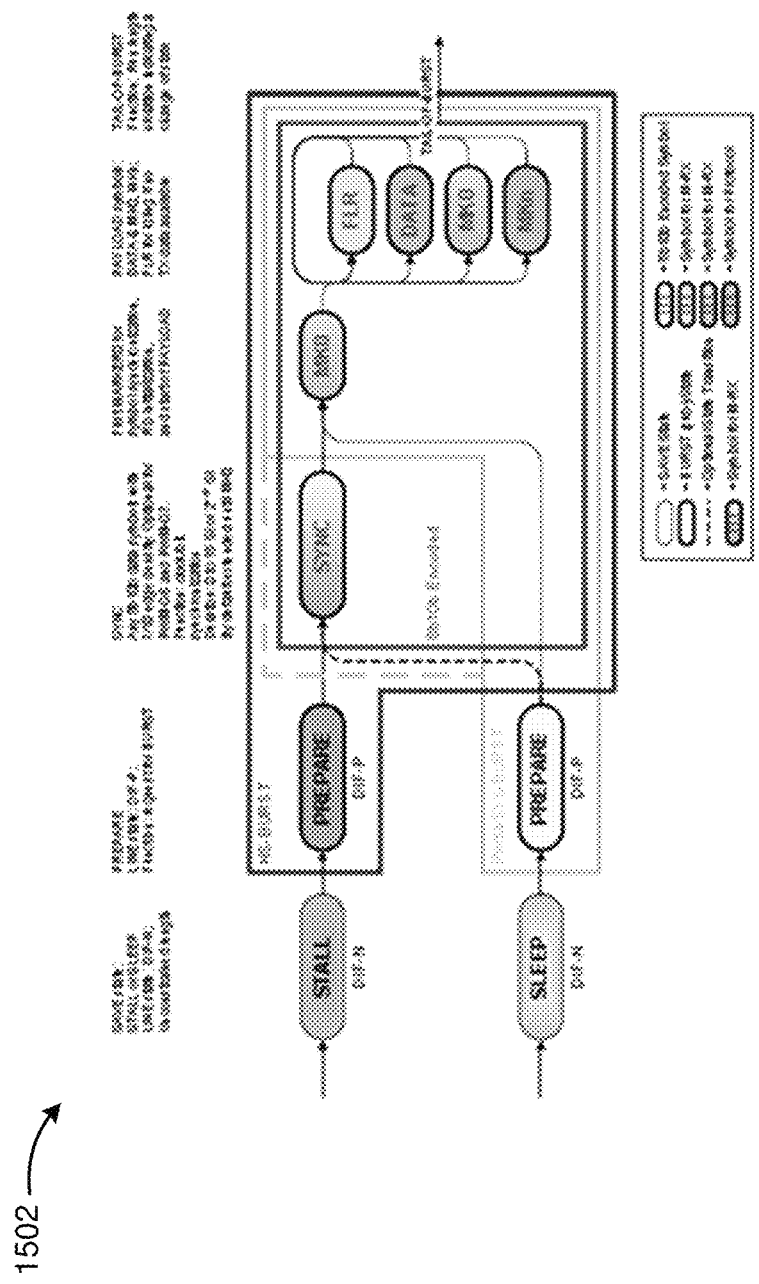
FIG. 15 depicts an exemplary block diagram of the smart bridge unit 604 and the UFS memory device.

FIG. 15 illustrates an exemplary block diagram of the smart bridge unit 604 and the UFS memory device 1116. The smart bridge unit 604 can be used to manage the data flow between the programmer 502 and the UFS memory devices 1116.

Regardless of data mode, data transmission is done in data BURSTs, with power saving states between BURSTs. The data is encoded and is DC-balanced. The running-disparity can be maintained at −1 or +1 between the 10b data blocks.

Each BURST starts from the power SAVE state. Each Burst is preceded by a PREPARE and succeeded by a series of b0s or b1s (TAIL-OF-BURST). In the case of PWM-signaling the last bit of the sequence is inverted to indicate the end of line activity.

In a finite state model of the Burst-Save operations, PREPARE is the initial sub-state of a BURST which allows the settling of a line level and transceiver settings before the bit stream is started. The line state during PREPARE is DIF-P. For HS-MODE, the PERPARE state is followed by a SYNC sequence.

The SYNC sequence is optional for PWM modes. Following the SYNC sequence, the payload is transmitted. The payload shall always start with a MARKER0 (MK0). MK0 is a control symbol of 8b/10b encoding. Details for 8b10b encoding can be found in the 8b10b Section of this document. Data bytes and control symbols can then be transmitted until the TAIL-OF-BURST is detected. Then the device can reenter the SAVE state.

Data BURSTs consist of control symbols and data symbols. A single data burst may include several data frames. A data frame can start with an MK0 symbol, include the data packet, a CCITT CRC16 can follow the data, and finally can be closed with a MARKER2 (MK2) control symbol. Reference the CCITT CRC16 section of this document for the CRC specifics. FILLER/NOP control symbols are used in between frames within a data BURST and to fill in any available data bytes in the data BURST that don't have data.

Figure 16:
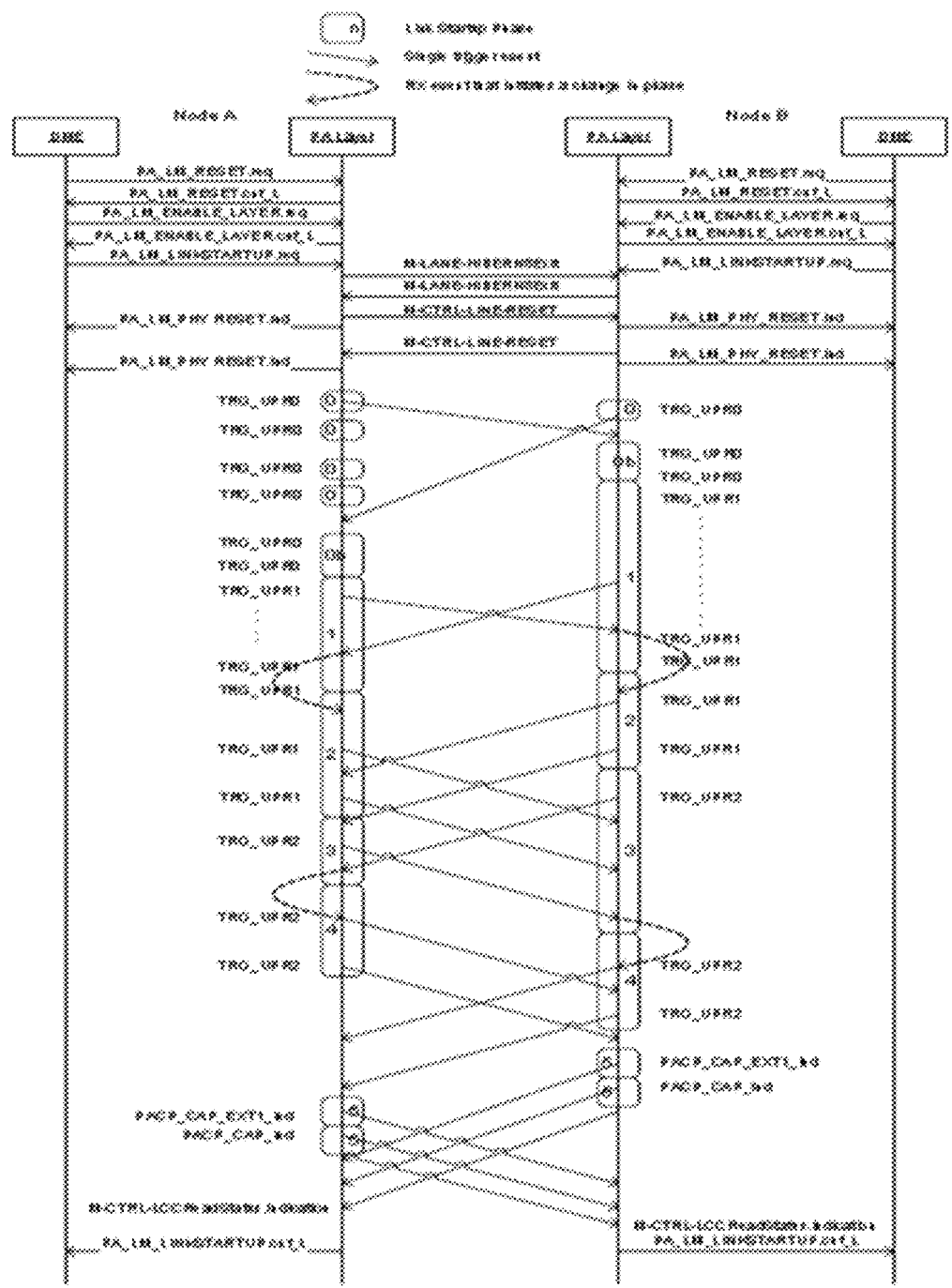
FIG. 16 depicts a link startup sequence.

FIG. 16 illustrates a link startup sequence 1502. The link startup sequence 1502 shows the process for starting up the data link layer.

The Capability exchange consists of transmission and reception of two PA Control Protocol (PACP) frames; PACP_CAP_ind and PACP_CAP_EXT1_ind. This exchange is used to determine and setup the initial configuration. Since there isn't presently a way to detect when a part is inserted or removed from the UFS socket 802, the discovery sequence and capability exchange sequence needs to be requested. An informative flow chart has been provided in FIG. 16 which shows the Discovery flow process. The initiation of a Discovery sequence can be initiated by the programmer 502 by sending a cmd0 when a content of '1'. The actual execution of the entire Discovery sequence can be controlled and executed solely by the FPGA device. The PHY adapter control protocol is a physical layer protocol for transferring data.

After the discovery sequence the UFS layer needs its initialization completed. This is done by first issuing a DL—NOP OUT command and then sending a DL—set flag command to set the fDevinit flag. Following the fDevinit flag getting set, Query read flag requests can be periodically sent out to monitor the fDevinit flag. Initialization of the UFS layer is complete when the flag is returned cleared ('0'). After the UFS is finished initializing, hardware tests have shown that the discovery sequence needs to be redone without the initially required UFS NOP and set fDevinit flag commands. Now the interface is ready to be put into another power mode (e.g. HS-G1).

Figures 17, 18, 19:
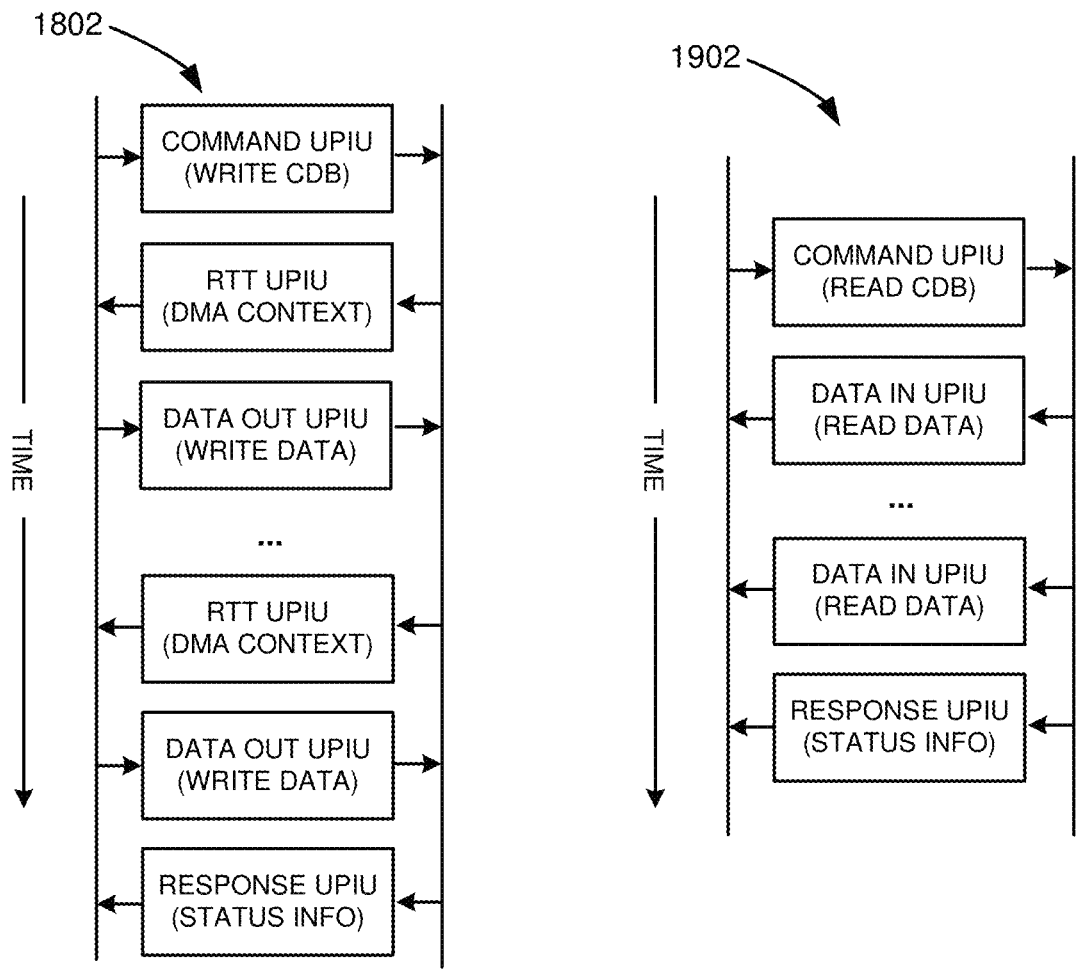
FIG. 17 depicts an example of the PACP frame format.
FIG. 18 depicts an example of a SCSI write command flow for the UFS memory device.
FIG. 19 depicts an example of a SCSI read command flow for the UFS memory device.

FIG. 17 illustrates an example of the PACP frame format. The PHY Adapter Control Protocol (PACP) frames 1702 can transfer data and control information.

PACP frames are transmitted as DL frames except that the start of the PACP frame can be aligned to Lane 0. PACP frames can also be interleaved into DL frames, at the Frame boundary or nested into a single DL frame.

The format of the PACP frame 1702 can include the ESC_PA field, the PACP_BEGIN field, the PAC_FunctionID field, parameter data and a CCITT CRC-16 checksum. The Parameter fields with the PACP frame 1702 vary for every PACP function ID type.

FIG. 18 illustrates an example of a SCSI write command flow 1802 for the UFS memory device 1116. The programming of data to the UFS memory device 1116 is done via SCSI commands contained within the DL frames 1302.

The programmer 502 is responsible for issuing the command UPIU which informs the UFS device data is incoming. The programmer 502 can transfer 4K blocks of data to the smart bridge unit 604, such as the Lattice FPGA. The smart bridge unit 604 can monitor for the RTT frames and generate the Data out UPIU packets as 4K bytes of data becomes available. The smart bridge unit 604 can be responsible for flow control.

FIG. 19 illustrates an example of a SCSI read command flow 1902 for the UFS memory device. The smart bridge unit 604 is responsible for issuing the SCSI read command. The smart bridge unit 604 can be responsible for flow control and delaying the UFS by maintaining the packet credits and transmitting them back to the UFS memory devices 1116 via AFC frames. The smart bridge unit 604 can be responsible for issuing a eMMC read command to retrieve the data from the RX FIFO.

Figure 20:
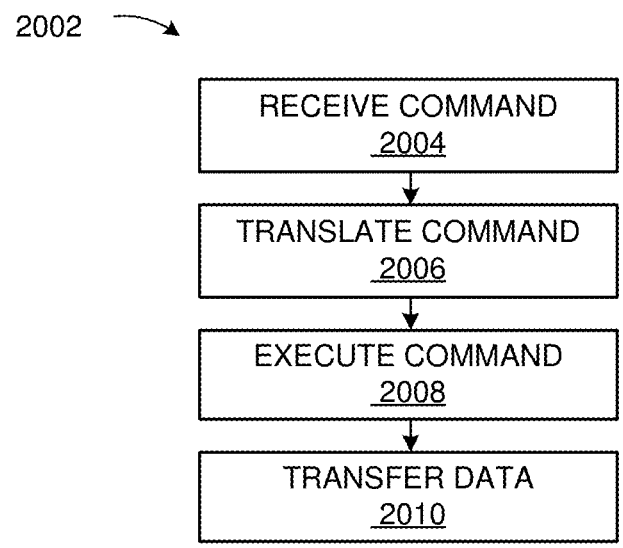
FIG. 20 depicts a flow chart of a method of operation of the device programming system in a further embodiment of the present invention.

FIG. 20 illustrates a flow chart of a method 2002 of operation of the device programming system in a further embodiment of the present invention. The method 2002 includes: a receiving a command in a block 2004, translating the command in a block 2006, executing the command in a block 2008, and transferring data in a block 2010.

It has been discovered that the device programming system furnishes important and heretofore unknown and unavailable solutions, capabilities, and functional aspects for quickly configuring and programming non-volatile memory devices.

The resulting processes and configurations are straightforward, cost-effective, uncomplicated, highly versatile and effective, can be surprisingly and unobviously implemented by adapting known technologies, and are thus readily suited for efficiently and economically manufacturing semiconductor packages fully compatible with conventional manufacturing processes and technologies.

While the invention has been described in conjunction with a specific best mode, it is to be understood that many alternatives, modifications, and variations can be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

4.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of operation of a device programming system comprising:

sending, by a programmer, a data transfer command to a universal flash storage (UFS) memory device via a UFS baseboard communicatively coupled to the programmer, and the UFS memory device inserted into a socket adapter coupled to the UFS baseboard; wherein the UFS baseboard is attached to the programmer via a board clamp, the UFS baseboard including a socket adapter exposed within a perimeter of the board clamp, the UFS baseboard including a field programmable gate array configured as a protocol bridge to translate between embedded multimedia card (eMMC) commands and UFS commands, the UFS baseboard including an eMMC interface and a UFS interface coupled to the protocol bridge, and the eMMC interface connected to the programmer;

receiving, by the eMMC interface, the data transfer command from the programmer;

transferring, by the eMMC interface, the data transfer command to the protocol bridge;

converting, by the protocol bridge, the data transfer command to UFS commands;

transferring data between the protocol bridge and the UFS device via the UFS interface; and transferring data between the protocol bridge and the programmer via the eMMC interface.

2. The method of claim 1 wherein transferring the data between the protocol bridge and the UFS memory device includes controlling data flow between the protocol bridge and the UFS memory device using a UFS monitor in the protocol bridge.

3. The method of claim 1 wherein transferring the data between the protocol bridge and the eMMC interface includes controlling data flow between the protocol bridge and the programmer using a UFS converter in the protocol bridge.

4. The method of claim 1 wherein transferring the data between the protocol bridge and the UFS memory device includes transferring the data using a CRC16 error-detecting code.

5. The method of claim 1 wherein transferring the data between the protocol bridge and the UFS memory device includes buffering the UFS data in a data buffer before transferring the data to the eMMC interface.

6. A method of operation of a device programming system comprising:

sending, by a programmer, a data transfer command to a universal flash storage (UFS) memory device via a socket adapter on a UFS baseboard communicatively coupled to the programmer, the UFS memory device inserted into a socket adapter coupled to an eMMC interface of the UFS baseboard; wherein the UFS baseboard is attached to the programmer via a board clamp, the UFS baseboard including a socket adapter exposed within a perimeter of the board clamp, the socket adapter attached to an adapter connecter on the UFS baseboard and configured to receive the UFS memory device, the UFS baseboard including a field programmable gate array configured as a protocol bridge to translate between embedded multimedia card (eMMC) commands and UFS commands, the UFS baseboard including an eMMC interface and a UFS interface coupled to the protocol bridge, and the eMMC interface connected to the programmer;

receiving, by the eMMC interface, the data transfer command from the programmer;

transferring, by the eMMC interface, the data transfer command to the protocol bridge;

converting, by the protocol bridge, the data transfer command to UFS commands;

transferring data between the protocol bridge and the UFS device via the UFS interface; and transferring data between the protocol bridge and the programmer via the eMMC interface.

7. The method of claim 6 wherein transferring the data between the protocol bridge and the UFS memory device includes transferring the data using an error correction code.

8. The method of claim 6 wherein transferring the data between the protocol bridge and the UFS memory device includes transferring data in 4K blocks.

9. The method of claim 6 wherein transferring the data between the protocol bridge and the UFS memory device includes calculating a cyclic redundancy check (CRC) for each UFS frame with a UFS translator module.

10. The method of claim 6 wherein transferring the data between the protocol bridge and the UFS memory device includes transferring the data in bursts and switching to a power saving mode between the bursts.

11. A device programming system comprising:

a programmer configured to program a UFS memory device;

a universal flash storage (UFS) baseboard, coupled to the programmer, the UFS baseboard attached to the programmer via a board clamp, the UFS baseboard including a field programmable gate array configured as a protocol bridge to translate between embedded multimedia card (eMMC) commands and UFS commands, the UFS baseboard including a UFS interface coupled to the protocol bridge, the UFS baseboard including an eMMC interface coupled to the protocol bridge, the eMMC interface connected to the programmer, the eMMC interface configured to receive a data transfer command, the protocol bridge configured to convert the data transfer command to UFS commands, the UFS interface configured to transfer the data to the protocol bridge, and the eMCC interface configured to transfer data with the protocol bridge; and a socket adapter attached to the UFS interface for mounting the UFS memory device, and the socket adapter exposed within a perimeter of the board clamp.

12. The system of claim 11 wherein the protocol bridge implements data flow control between the protocol bridge and the UFS memory device using a UFS monitor in the protocol bridge.

13. The system of claim 11 wherein the protocol bridge includes a UFS converter configured to control the data flow between the protocol bridge and the programmer.

14. The system of claim 11 wherein the protocol bridge implements a CRC 16 error-correcting code.

15. The system of claim 11 wherein the protocol bridge buffers the data in a data buffer before transferring the data to the eMMC interface.

16. The system of claim 11 further comprising a socket adapter mounted on an adapter connecter on the UFS baseboard configured to receive the UFS memory device.

17. The system of claim 16 wherein the protocol bridge transfers data using an error correction code for each frame of the data.

18. The system of claim 16 wherein the protocol bridge transfers the data in 4K blocks.

19. The system of claim 16 further comprising a UFS translator module for calculating cyclic redundancy check for each UFS frame.

20. The system of claim 16 wherein the protocol bridge transfers the data in bursts and switches to a power saving mode between the bursts.

* * * * *